Oct. 1, 1929.  H. K. KRANTZ ET AL  1,729,879
PANEL TRIM CLAMP
Filed April 30, 1926
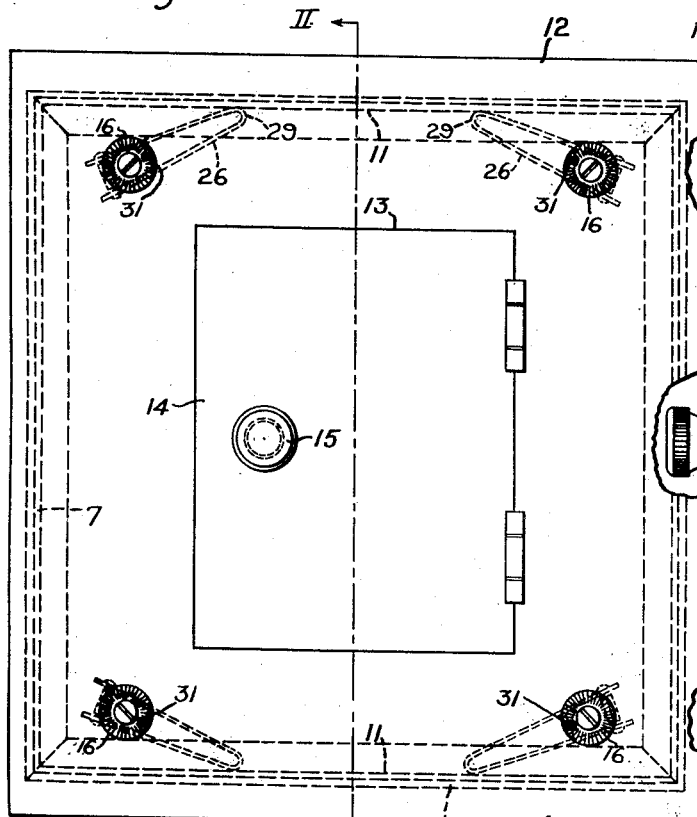
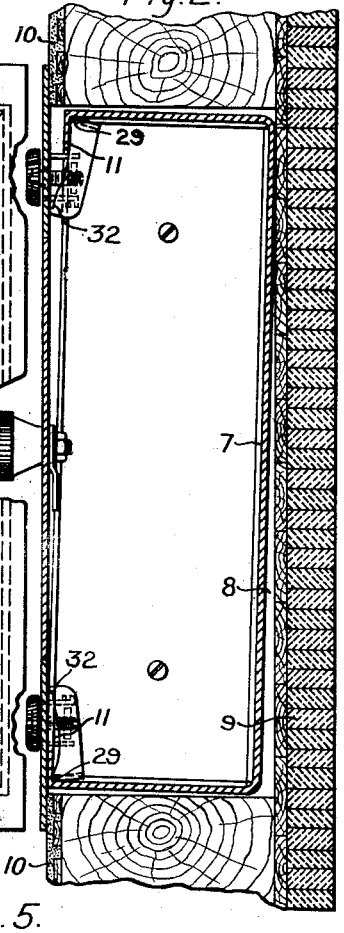
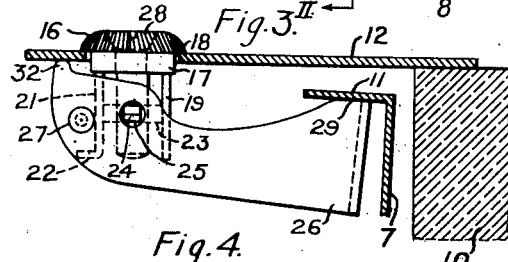
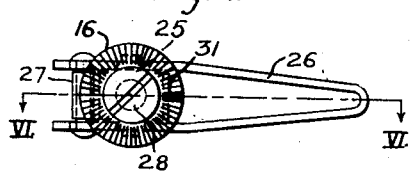
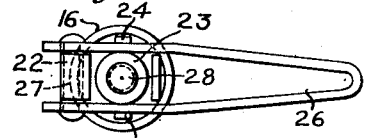
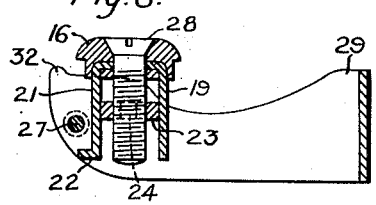
WITNESSES:
Wm. C. Groome
J. H. Kendig
INVENTORS.
Hubert K. Krantz &
Harold G. Baxter.
BY
Wesley G. Carr
ATTORNEY Patented Oct. 1, 1929

1,729,879

UNITED STATES PATENT OFFICE

HUBERT K. KRANTZ, OF ROCKVILLE CENTER, AND HAROLD G. BAXTER, OF BALDWIN, NEW YORK, ASSIGNORS TO WESTINGHOUSE ELECTRIC AND MANUFACTURING COMPANY, A CORPORATION OF PENNSYLVANIA

PANEL-TRIM CLAMP

Application filed April 30, 1926. Serial No. 105,754.

Our invention relates to clamps and particularly to clamps for attaching the trim of an electrical distributing panel box to the box structure that is usually mounted within a recess in a wall.

One object of our invention is to provide a simple clamp construction wherein the angular position of the clamp may be adjusted from the exterior of the trim or cover plate; wherein the screw for effecting clamping adjustment is operable from the exterior of the trim or cover and wherein the adjusting means and clamping screw occupy proper aligned position, regardless of the position of the box or panel housing with respect to the cover.

Another object of our invention is to provide a trim or cover clamp that may be adjusted from the exterior of the trim or cover and may indicate the angular position of the clamp.

Another object of our invention is to provide a trim clamp that is capable of a wide range of adjustment in order to engage the box when it has been placed in angular relation to the trim and at a considerable distance therefrom.

The usual form of trim clamp consists of a clamp member threaded upon a screw which extends through the trim or cover, the head being accessible from the outer side of the cover. In order to obtain angular adjustment of the clamp member, the frictional engagement of the clamp member with the screw threads is relied upon to turn the clamp member into engagement with the inner side of the box flange. The frictional engagement is sometimes increased by the provision of a compression spring disposed between the clamp and the inner side of the cover. One end of the clamp member is bent toward the cover to serve as a fulcrum about which the clamp member pivots, the free end being adapted to engage the inner side of the box flange.

Trim clamps of this type are difficult to adjust into proper position with respect to the flange of the housing or box, and, in cases where the box is angularly disposed with respect to the plane of the trim, the clamp is disposed at an angle with respect to the trim or cover, causing the head of the screw on the outer side of the cover or trim to be tilted to a noticeable degree, thereby marring the appearance of the trim assembly. It is also difficult to determine whether the clamp actually engages the flange, because there is no means of indicating its angular position.

It is a further object of our invention to provide a trim clamp that may be adjusted through a wide range, and wherein the angular position may be indicated, and which greatly facilitates the assembly of a trim upon a housing.

These and other objects that will be made apparent throughout the further description of our invention are attained in the clamp mechanism illustrated in the accompanying drawing and hereinafter described, wherein:

Figure 1 is a front elevational view of a trim and box assembly that is secured by clamps, embodying features of our invention;

Fig. 2 is a vertical section through the panel housing, taken on the line II—II of Fig. 1;

Fig. 3 is an elevational view of our improved form of trim clamp;

Fig. 4 is a front plan view of the clamp shown in Fig. 3;

Fig. 5 is a bottom plan view of the clamp shown in Fig. 3; and

Fig. 6 is a longitudinal section through the clamp, taken on the line VI—VI of Fig. 4.

Referring to the drawings, Figs. 1 and 2 illustrate the usual form of distributing panel box or housing 7 that is usually mounted in a recess 8 in a wall structure 9, the box or housing constituting a receptacle and support for various forms of electric wiring and current-distributing electrical devices.

As indicated in Fig. 2, it frequently occurs that the panel or housing is not correctly alined with the wall surfaces and, consequently, the plane of the front face or marginal flange 11 of the box 7 is disposed at an angle to the plane of the wall surface. The box is frequently so positioned that considerable space exists between the front face or plaster surface of the wall and the marginal flange of the box. Such a space is indicated at the upper end of Fig. 2.

The trim usually comprises a flat metal plate 12 that is provided with an opening 13, closed by a hinged door 14 that is usually provided with a latch handle 15 for retaining the door in closed position. The trim plate 12 is of greater dimensions than the recess 8 and is designed to be pressed snugly against the plaster-surface of the wall 10 when in assembled position with respect to the panel housing.

In order to securely clamp the trim or cover 12 in position, adjustable clamps are provided, such as those illustrated in detail in Figs. 3 to 6, inclusive. The clamp structure comprises an operating member or button 16 having an enlarged knurled head and a cylindrical portion 17 that is swiveled in a circular opening 18 in the cover plate 12.

The button 16 is provided with a pair of guide arms 19 and 21, the latter being provided with a bent-over stop flange 22, the purpose of which will hereinafter appear. The guide arms 19 and 21 are, preferably, formed in one piece by a stamping operation and subsequently embedded in the operating button 16 which is preferably made by a die-casting operation. The enlarged portion of the operating button 16 is knurled, as indicated in the drawings, in order to provide a roughened surface which may be gripped by the thumb and fingers of the operator to angularly adjust the clamp member which is pivotally connected thereto in a manner to be hereinafter described.

Between the guide arms 19 and 21, a threaded pivot member 23 is mounted and is provided with a pair of pivot shafts 24 that extend through perforations 25 in the free ends of a clamp member 26 which comprises a sheet-metal stamping of U-shape, as indicated in Figs. 3 to 6. The free ends of the clamp member are rigidly fixed in spaced relation by means of a rivet 27 which is so positioned that it engages the stop flange 22 and limits outward movement of the pivoted end of the clamp member 26.

The pivot member 23 is adjusted to different positions by means of a flat head screw 28 that extends through the operating button 16 and through a threaded hole in the pivot member. When the screw is rotated counterclockwise, the pivot member 23 is moved away from the cover, thus causing inward movement of the clamp member until the rivet 27 engages the stop flange 22. Further movement of the screw causes the clamp member 26 to rotate about the pivot shafts 24, thus withdrawing the clamp nose 29 of the clamp member from the inner face of the cover to a position behind the marginal flange 11 of the panel box or housing 7.

After the clamp member 26 has been moved to open position, it may be rotated by the operating button 16 to the positions indicated in the dotted lines in Fig. 1, wherein the clamping nose 29 lies behind the flanges 11 of the panel box.

The position of the clamp members is indicated by the unknurled portion 31 of the button 16, which are alined with the longitudinal axes of the clamp members. After the clamp members have been moved to the positions indicated in Fig. 1, the screws 28 are turned in a clockwise direction, causing the clamp member 26 to be drawn toward the inner face of the cover. The pivoted ends of the clamp members are provided with rounded extensions 32 that engage the inner face of the trim or cover and serve as a fulcrum about which the clamp member turns after engagement. Further inward movement of the pivot member 23 causes the clamp member to be drawn toward the marginal flange 11 and to finally engage it, as indicated in Figs. 2 and 3, and retain the trim in assembled position with respect to the wall and the panel box or housing.

It will be seen, from the foregoing, that a trim clamp is provided which may be adjusted through a relatively wide range without causing angular displacement of the clamping screw with respect to the trim, and that a trim clamp is provided which may be positively manipulated to different angular positions from the exterior of the cover and which indicates the position of the clamp. The construction facilitates the assembly of the trim upon the housing and permits the trim to be accurately positioned upon the wall, regardless of the angular position of the housing which is usually roughly mounted in the wall recess. The construction is simple, inexpensive to manufacture and of neat appearance.

While we have illustrated and described but one embodiment of our invention, it will be apparent to those skilled in the art that various modifications and changes may be made therein without departing from the spirit and scope thereof, as set forth in the appended claims.

We claim as our invention:

1. The combination with a support and a cover therefor, of a clamp member pivotally mounted on the interior of the cover for engaging the support, means operable from the outer side of the cover for operating the clamp member, and a position-indicating means operable from the outer side of the cover for rotating the clamp member.

2. The combination with a support and a cover therefor, of a clamp member pivotally mounted on the interior of the cover for engaging the support, means operable from the outer side of the cover for operating the clamp member, and a means for indicating the angular position of the clamp member that is visible from the exterior of the cover.

3. A clamp for connecting a pair of members comprising a device pivotally mounted on one side of one member and engaging the other member, means operable from the other side of the first said member for moving the device into and out of engagement with the second said member, and position indicating means operable from the said other side of the first member for rotating the device.

4. A cover clamp comprising a pivotally mounted clamp member rotatably swiveled on the inner side of the cover and operable from the outer side thereof to various angular positions, and means operable from the outer side of the cover for moving the clamp member on its pivot.

5. A cover clamp comprising an operating member swiveled in the cover, a clamp member pivotally mounted upon the operating member, and a screw for imparting clamping movement to the clamp member.

6. A cover clamp comprising an operating member swiveled in the cover, a pivot member adjustably mounted on the operating member and a clamp member pivotally mounted on the pivot member.

7. A cover clamp comprising an operating member swiveled in the cover, a pivot member adjustably mounted in the operating member, a screw for actuating the pivot member and a clamp member pivotally mounted on the first member.

8. A cover clamp comprising an operating member swiveled in the cover and having a pair of guide members, an adjustable pivot member disposed between the guide members, a screw extending through the operating member and having threaded engagement with the pivot member, and a clamp member of U-shape having its free ends straddling the pivot member and pivotally connected thereto, the said ends engaging the cover and the other end of the clamp member engaging the article to which the cover is attached.

9. A cover clamp comprising an operating member swiveled in the cover and having a pair of guide members, an adjustable pivot member disposed between the guide members, a screw extending through the operating member and having threaded engagement with the pivot member, and a clamp member of U-shape having its free ends straddling the pivot member and pivotally connected thereto, the said ends being provided with a stop for engaging the guide members for limiting movement thereof and to permit movement of the other end of the clamp member.

In testimony whereof, we have hereunto subscribed our names this 13th day of April, 1926.

HUBERT K. KRANTZ.
HAROLD G. BAXTER.